United States Patent [19]

Schultz et al.

[11] 4,107,507
[45] Aug. 15, 1978

[54] ARC WELDING PROCESS AND APPARATUS

[75] Inventors: Jean-Pierre Schultz, Les Mureaux; Francis Cuny, Mantes-La-Jolie; Daniel Payraudeau, Aulnay-sous-Bois; Jean-Marie Tritz, Les Mureaux, all of France

[73] Assignee: L'Air Liquide Societe Anonyme pour l'Etude et l'Exploitation des Procedes Georges Claude, Paris, France

[21] Appl. No.: 475,879

[22] Filed: Jun. 3, 1974

[30] Foreign Application Priority Data

Jun. 6, 1973 [FR] France .................. 73.20490

[51] Int. Cl.² .................................................. B23K 9/00
[52] U.S. Cl. .......................... 219/121 P; 219/137 R; 315/111
[58] Field of Search ........... 219/121 P, 75, 76, 137 R; 313/231; 315/111; 13/31

[56] References Cited

U.S. PATENT DOCUMENTS

| 2,806,124 | 9/1957 | Gage | 219/121 P |
| 3,153,133 | 10/1964 | Ducati | 219/121 P |
| 3,246,115 | 4/1966 | Johnson | 219/121 P |
| 3,248,513 | 4/1966 | Sunnen | 219/121 P X |
| 3,311,735 | 3/1967 | Winzeler et al. | 219/121 P |
| 3,344,256 | 9/1967 | Anderson | 219/121 P |
| 3,375,392 | 3/1968 | Brzozowski et al. | 313/231 |
| 3,536,885 | 10/1970 | Mitchell | 219/121 P |

FOREIGN PATENT DOCUMENTS 1,280,727   7/1972   United Kingdom ........... 219/69

Primary Examiner—J. V. Truhe
Assistant Examiner—Clifford C. Shaw
Attorney, Agent, or Firm—Lee C. Robinson, Jr.

[57] ABSTRACT

An arc welding process and apparatus utilising an electrode and a counter-electrode between which a column of plasma forms. A first unidirectional current source is located between the electrode and the counter-electrode, and a second unidirectional current source is located between the counter-electrode and the member to be welded. These two sources simultaneously pass the two unidirectional currents.

8 Claims, 6 Drawing Figures

ARC WELDING PROCESS AND APPARATUS

BACKGROUND OF THE INVENTION

This invention relates to a process and apparatus for the electrical arc welding of metal members in particular metals or alloys, on which there forms, during welding, a film of refractory oxide, such as aluminum, magnesium and their alloys.

The present invention, while of general application, is particularly well suited for use in welding systems of the type having a refractory electrode which is frequently lodged in an electrically conductive nozzle. The nozzle serves as a counter-electrode through which passes an ionizable fluid. The refractory electrode and the nozzle carry a unidirectional electric current giving rise to an arc which, under the action of the ionizable fluid, forms a column of plasma between the electrode and the nozzle on the one hand and the object to be welded on the other hand.

It is known that the layer of refractory oxide which forms on specific metals, such as those mentioned hereinabove, does not permit the utilization of conventional welding processes and apparatus of the type employed to weld metals such as iron and steel, and the heavy metals in general. Certain processes and apparatus have been proposed for permitting the welding of these refractory oxide metals, but they have been subject to a number of disadvantages. The prior processes and apparatus commonly involved either electric arc welding or plasma welding techniques, including those utilizing an electrode lodged in a nozzle confining the arc by means of its outlet orifice. In cases in which a source of direct current was connected between the electrode and the members to be welded, intense bombardment of the electrode took place, resulting in its comparatively rapid deterioration. Equipment utilizing alternating current had the disadvantage that it involved the problem of restriking the arc at each alternation, such as by a supplementary current source for striking a permanent pilot arc between the electrode and the nozzle. In the case of plasma welding techniques, the column of plasma often passed in random or erratic fashion through the nozzle, resulting in instability of the arc.

Some of the attempts to overcome these difficulties involved the use of blown plasma, wherein the plasma produced by the arc "bursts" between the electrode and the nozzle and is projected by ionizable fluid flow supplied at a high rate externally of the nozzle. Primarily because of the direction of travel of the electrons and the electrical neutrality of the workpieces to be welded, however, the prior blown plasma techniques were not particularly effective in overcoming the layer of refractory oxide.

Other attempts to solve these problems effected arcing alternatingly between a negatively charged electrode and a positive workpiece and then between the negative workpiece and a positive nozzle. The arc between the electrode and the workpiece constituted the welding arc, whereas the arc between the workpiece and the nozzle was used to destroy the layer of refractory oxide on the surface to be welded. This technique had several disadvantages, including a relatively complicated electronic circuit and the necessity for periodically interrupting the current to provide the desired alternations. This in turn required a pilot arc for maintaining the arc between the electrode and the nozzle.

SUMMARY

It is an object of the present invention to obviate the disadvantages of the various prior processes and apparatus mentioned herein-above, and to provide a new and improved process and apparatus for the electrical welding of workpieces.

In accordance with a particularly important embodiment of the invention, a first unidirectional current is passed between the workpieces to be welded and the nozzle or other counter-electrode simultaneously with passage of a second unidirectional current between the main electrode and the counter-electrode. The polarities are such that the flow of electrons constituting the first current advantageously travels from the workpieces to the counter-electrode.

The invention permits utilization of a column of plasma resulting from the blown arc produced by the second unidirectional current and a stream of ionized fluid. The column of plasma serves as an electrical conductor for the passage of the first uni-directional current, and because of the direction of travel of the electrons from the workpieces to be welded toward the counter-electrode any oxide or other scaling on the workpieces is removed. The presence of the blown arc prevents the descaling arc from becoming "erratic" and consequently stabilizes the functioning of the apparatus. It should also be pointed out that, since the two unidirectional currents flow simultaneously, there is no need to provide an elaborate circuit of the type employed in prior processes utilizing the sequential passage of two currents.

Furthermore, since the two arcs are fed with unidirectional current, there is no periodic quenching of the arc. Consequently, there is no necessity for providing a pilot to maintain the arc between the electrode and the counter-electrode, the blown arc guaranteeing permanent striking.

According to a further feature of certain advantageous embodiments of the invention, the second unidirectional current flows in a direction such that the electrons in the plasma column move toward the workpiece to be welded and then reverse direction and return to the counter-electrode. The scaling electrons flowing from the workpieces to the counter-electrode are propagated by utilizing that portion of the plasma column through which the electrons flow in the same direction. This electron flow is achieved by maintaining the main electrode and the workpieces at negative potential relative to the counter-electrode.

The unidirectional currents may according to the invention be either continuous or pulsed currents.

The invention also relates to apparatus for carrying into effect the above process. The apparatus includes an electrode, a counter-electrode, means for forming an ionizable fluid flux, and a source of unidirectional current connected to the electrode and the counter-electrode. A second source of unidirectional current is connected to the counter-electrode and the workpieces to be welded and is effective to direct electrons from the workpieces to the counter-electrode. The counter-electrode preferably comprises a nozzle enveloping the electrode in spaced relationship therewith to provide an ionizable fluid flow. The current sources may produce either continuous current or pulsed current, and the currents illustratively may be obtained from an alternating current supply.

The present invention, as well as further objects and features thereof, will be more fully understood from the following description of certain preferred embodiments, when read with reference to the accompanying drawings.

DESCRIPTION OF CERTAIN PREFERRED EMBODIMENTS

Figure 1:
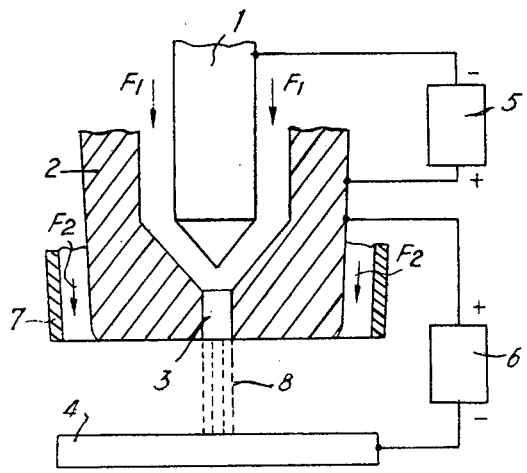
FIG. 1 illustrates an embodiment of the process according to the invention and shows, in diagrammatic fashion, apparatus for carrying out the process.
Figure 2:
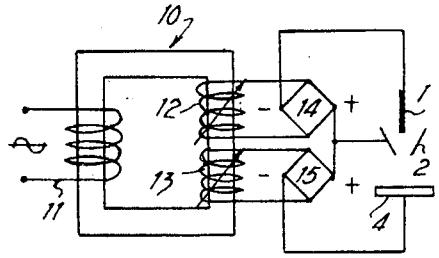
FIG. 2 shows, diagrammatically, a first embodiment of an electrical circuit for the apparatus.

Referring to FIG. 1, the apparatus includes an electrode 1 in the form of a substantially cylindrical rod of tungsten or other refractory material. The electrode 1 is disposed in spaced relationship within an annular nozzle 2 constituting a counter-electrode having the general shape of a body of revolution and manufactured from an electrically conductive material such as copper. The electrode 1 and the nozzle 2 are disposed concentrically to each other.

The lower end of the nozzle 2 terminates in a generally cone shape as does the corresponding end of the electrode 1. An orifice 3 is located at the lower end of the nozzle 2, and the nozzle is connected at its upper end to a source (not shown) of ionizable fluid such that the fluid flows at a relatively high rate past the electrode 1, as indicated by the arrows F1, and then through the orifice 3. The fluid advantageously comprises a gas which is ionizable under pressure and may be a rare or inert gas, such as argon, helium, nitrogen, or a mixture of such gases. In several preferred embodiments the flow rate of the fluid is maintained within the range of from about 0.1 liters per minute to about 10.0 liters per minute.

The element to be welded, shown here in the form of a single workpiece 4, is disposed in spaced juxtaposition with the refractory electrode 1 and the counter-electrode 2 such that the weld is formed substantially at right angles to the orifice 3.

A first source of unidirectional current 5 has its positive terminal connected to the counter-electrode 2 and its negative terminal connected to the refractory electrode 1. A second source of unidirectional current has its positive terminal connected to the counter-electrode 2 and its negative terminal connected to the workpiece 4. Surrounding the counter-electrode 2 is a conduit 7 for the passage of a protective gas, known as "annular gas," which flows in the direction of the arrows F2 and illustratively may comprise helium.

Due to the voltage resulting from the first source 5, there flows between the electrode 1 and the nozzle 2 a first current in the form of a blown arc. The ionized atmosphere resulting therefrom is expelled out of the nozzle through the orifice 3 by the flow of gas to form a rigid and cylindrical plasma column 8. Upon reaching the workpiece 4, the plasma column 8 establishes, between the nozzle and the electrode on the one hand and the workpiece on the other hand, a blown arc which serves as a gaseous electric conductor. In this plasma column the electrons issuing from the electrode travel toward the workpiece 4 but then reverse direction and are received by the nozzle 2.

The voltage from the second source 6 brings about the passage, between the workpiece 4 and the nozzle 2, of a second current simultaneously with the first current. The electrons which make up the second current flow from the workpiece to the nozzle and travel along the path constituted by the plasma column 8.

The electrons issuing from the workpiece 4 rupture the layer of refractory oxide which tends to form on the workpiece. The electrons produce a "transferred" arc which simultaneously perform both a scaling and a welding function. Due to the simultaneous passage of the two unidirectional currents, workpieces of metals such as aluminum, magnesium, or their alloys, which tend to be covered with a film or "skin" of refractory oxide, may be readily welded in a rapid and straight-forward manner. The voltage sources provide a current intensity sufficient to bring about the local fusion of the metal to form the weld.

The unidirectional current from the sources 5 and 6 may be a direct current such as that supplied by batteries of elementary cells, storage cell batteries or capacitor batteries, or a pulsed current such as that produced by certain types of a.c. powered rectifier circuits. In the latter case the current preferably does not reach zero value so as not to quench the arc, but if the situation warrants conventional artifices (high frequency, pilot arc, etc.) may be employed to maintain the arc following the passage of the current through zero.

Successful experiments have been made with a refractory electrode containing 2% thorium oxide and a copper nozzle or counter-electrode. The d.c. generators employed each had a no-load voltage of 160 volts. The plasmagenic gas was argon supplied at a flow rate of 0.3 liter per minute, and helium was used as the "annular" gas. These experiments have shown that the control of the transferred arc and of the blown arc should be in accordance with different criteria. The intensity of the transferred arc is a function of the thickness to be welded, as demonstrated by the following table which gives, by way of example, the optimum intensity of the transferred arc for the welding of aluminum workpieces of different thicknesses:

| Transferred Arc | |
|---|---|
| Workpiece Thickness (in millimeters) | Optimum Intensity (in amperes) |
| 0.4 | 4.5 |
| 1.0 | 8.0 |
| 1.5 | 9.0 |
| 2.0 | 12.0 |
| 2.5 | 17.0 |
| 3 | 20.0 |

The intensity of the blown arc is a function of the mass of the welding torch, the efficacy of cooling and the length of the desired arc. For a torch of low mass (i.e. having an external diameter of about 15 to 20 mm. with a nozzle having a diameter of approximately 10 mm. and capable of withstanding 30 to 35 amperes), the arc intensity should be at least about three amperes for best results. For a torch of medium mass (i.e. having an external diameter of about 25 mm., a nozzle having a diameter of approximately 15 mm. and capable of withstanding 110 to 120 amperes) the optimum intensity of the arc should be at least about 23 amperes.

With regard to the effective arc length and hence flexibility of utilization, experiments have shown that, for a low-mass torch and a transferred current having an intensity of 3 amperes, with a blown arc intensity of 3 amperes the useful arc is about 10 mm. When the blown arc intensity is increased to 20 amperes, the useful arc is about 15 mm. A blown arc of high intensity thus permits welding with arc heights substantially greater than those obtained by previously known processes.

FIGS. 2 to 5 show various embodiments of unidirectional generators having a.c. rectifier circuits. The circuit of FIG. 2 includes a single transformer 10 comprising a primary winding 11 fed with a.c. and two controllable secondary windings 12 and 13. The windings 12 and 13 are respectively connected to two rectifier bridges 14 and 15 of conventional type which supply currents to the welding apparatus of FIG. 1.

Figure 3:
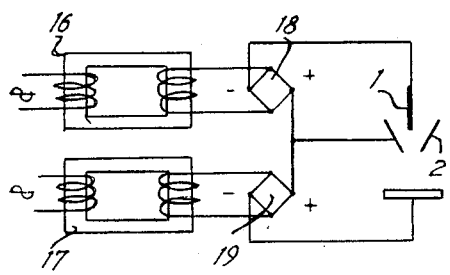
FIG. 3 shows, diagrammatically, a second embodiment of the electrical circuit.

The circuit of FIG. 3 employs a pair of independent transformers 16 and 17. The primary coils of the transformers 16 and 17 are connected to separate a.c. supplies, while the secondary coils are connected to two rectifier bridges 18 and 19.

Figure 4:
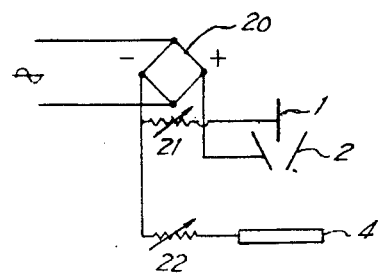
FIG. 4 shows, diagrammatically, a third embodiment of such electrical circuit.

The circuit of FIG. 4 does not employ transformers but instead includes a rectifier bridge 20 connected across the a.c. supply. The positive terminal of the bridge 20 is connected directly to the nozzle 2, whereas the negative terminal is connected to the electrode 1 and to the workpiece 4 through variable resistors 21 and 22, respectively.

Figure 5:
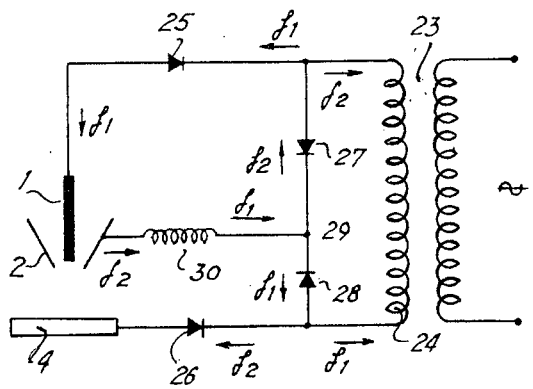
FIG. 5 shows, diagrammatically, a fourth embodiment of the electrical circuit.

The circuit of FIG. 5 comprises a transformer 23, the primary coil of which is fed with a.c. The single secondary coil 24 of the transformer supplies a circuit comprising a diode rectifier 25 connected to the electrode 1, a diode rectifier 26 connected to the workpiece 4, and two additional diode rectifiers 27 and 28 connected in series across the coil 24. The common terminal 29 of the rectifiers 27 and 28 is connected through an inductance coil 30 to the nozzle 2. The arrows $f1$ indicate the flow of the current (adopting the direction of displacement of the electrons) forming the blown arc, and the arrows $f2$ represent the flow of the current forming the transferred arc.

Figure 6:
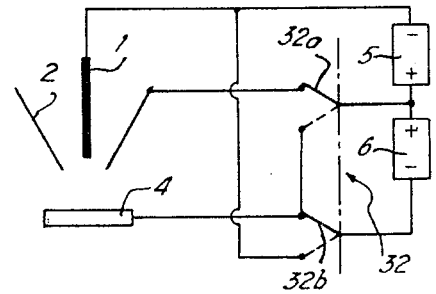
FIG. 6 shows a wiring diagram for the apparatus which permits operation in various modes.

FIG. 6 shows the wiring diagram of a feed circuit for the welding apparatus. This circuit comprises an inverter or change-over switch 32 having two contact arms 32a and 32b. The arm 32a is connected to the positive terminals of the unidirectional current sources 5 and 6 and serves to supply current either to the nozzle 2 or to the workpiece 4. The arm 32b leads to the negative terminal of the source 6 and is effective to connect the terminal either to the workpiece 4 or to the electrode 1. This latter electrode is permanently connected to the negative terminal of the source 5.

The circuit of FIG. 6 enables, depending on the position of the inverter 32, the welding of the workpiece in accordance with two successive techniques. With the inverter 32 in its solid line position, the weld is formed utilizing a blown arc and a transferred scaling and welding arc in the manner described heretofore. When the inverter is in its broken line position, welding may be effected in a conventional manner by means of the single transferred arc which passes between the electrode 1 and the workpiece. This second technique is only effective in the absence of a film of refractory oxide.

It should be pointed out that the invention is in no way limited to the particular modes of embodiments which have been shown and described and which have been given purely by way of example, and that it furthermore comprises all means constituting equivalent techniques and falling within the scope of the accompanying claims.

What is claimed is:

1. A process for the electrical arc welding of workpieces, the process com in combination:
    positioning a refractory electrode and an electrically conductive counter-electrode in spaced relationship with each other in juxtaposition with the workpiece to be welded;
    supplying ionizable fluid to the space between the refractory electrode and the counter-electrode;
    connecting a first d.c. voltage source between the refractory electrode and the counter-electrode to maintain the same at opposite polarities and thereby produce a first unidirectional electric current, the positive terminal of said first source being connected to said counter-electrode and the negative terminal of said first source being connected to said refractory electrode, the first current forming an arc which, in conjunction with the ionizable fluid, produces a plasma column between the refractory electrode and the counter-electrode on the one hand, and the workpieces on the other hand, the first unidirectional current comprising a continuous uninterrupted stream of electrons in the plasma column travelling toward said workpieces; and
    connecting a second d.c. voltage source between the workpieces and the counter-electrode to produce a second unidirectional current simultaneously with the first unidirectional current, the positive terminal of said second source being connected to said counter-electrode and the negative terminal of said second source being connected to said workpieces, the electrons forming the second unidirectiona current flowing from the workpieces to the counter-electrode;
    each of the unidirectional currents being a continuous constant current.

2. A process for the electrical arc welding of workpieces, the process comprising, in combination:
    positioning a refractory electrode and an electrically conductive counter-electrode in spaced relationship with each other in juxtaposition with the workpieces to be welded;
    supplying ionizable fluid to the space between the refractory electrode and the counter-electrode;
    maintaining a rate of flow of the ionizable fluid through said space within the range of from about 0.1 liters per minute to about 10.0 liters per minute;
    connecting a first d.c. voltage source between the refractory electrode and the counter-electrode to maintain the same at opposite polarities and thereby produce a first unidirectional electric current, the positive terminal of said first source being connected to said counter-electrode and the negative terminal of said first source being connected to said refractory electrode, the first current forming an arc which, in conjunction with the ionizable fluid, produces a plasma column between the refractory electrode and the counter-electrode on the one hand, and the workpieces on the other hand; and connecting a second d.c. voltage source between the workpieces and the counter-electrode to produce a second unidirectional current simultaneously with the first unidirectional current, the positive terminal of said second source being connected to said counter-electrode and the negative terminal of said second source being connected to said workpieces, the electrons forming the second unidirectional current flowing in a continuous uninterrupted stream from the workpieces to the counter-electrode.

3. A process as defined in claim 2, in which the electrons forming the first unidirectional current are carried by the plasma column in a continuous uninterrupted stream from the refractory electrode toward the workpieces.

4. Apparatus for the electrical arc welding of workpieces, the apparatus comprising, in combination:
first electrode means of refractory material;
counter-electrode means in spaced relationship with the first electrode means;
means for supplying ionizable fluid to the space between the first electrode means and the counter-electrode means;
a first unidirectional current source having a negative terminal connected to the first electrode means and a positive terminal connected to the counter-electrode means to produce a first unidirectional current, the first unidirectional current forming an arc which, in conjunction with the ionizable fluid, produces a plasma column between the first and counter-electrode means on the one hand, and the workpieces to be welded on the other hand, the electrons in the plasma column travelling in a continuous uninterrupted stream toward said workpieces; and
a second unidirectional current source having a positive terminal connected to the counter-electrode means and a negative terminal connected to the workpieces to produce a second unidirectional current simultaneously with the first unidirectional current, the electrons forming the second unidirectional current flowing in a continuous uninterrupted stream from the workpiece to the counter electrode means.

5. Apparatus for the electrical arc welding of workpieces, the apparatus comprising, in combination:
first electrode means of refractory material;
counter-electrode means in spaced relationship with the first electrode means, the counter-electrode means defining a nozzle in juxtaposition with the workpiece to be welded;
means for supplying ionizable fluid to the nozzle;
a first unidirectional continuous current source having a negative terminal connected to the first electrode means and a positive terminal connected to the counter-electrode means to produce a first unidirectional current, the first unidirectional current forming an arc which, in conjunction with the ionizable fluid, produces a plasma column between the first and counter-electrode means on the one hand, and the workpieces to be welded on the other hand, the electrons in the plasma column travelling in a continuous uninterrupted stream toward said workpieces; and
a second unidirectional continuous current source having a positive terminal connected to the counter-electrode means and a negative terminal connected to the workpieces to produce a second unidirectional current simultaneously with the first unidirectional current, the electrons forming the second unidirectional current flowing in a continuous uninterrupted stream from the workpieces to the counter-electrode means.

6. Apparatus as defined in claim 5, in which each of the current sources comprises a direct current generator.

7. Apparatus as defined in claim 5, which further comprises, in combination:
a supply of alternating current; and
rectifier means interconnecting the alternating current supply to each of the unidirectional current sources for converting alternating current to said first and second unidirectional currents.

8. Apparatus for the electrical arc welding of workpieces, the apparatus comprising, in combination
only a single pair of electrodes including a first electrode of refractory material and a counter-electrode in spaced relationship with the first electrode;
means for supplying ionizable fluid to the space between the first electrode and the counter-electrode;
a first unidirectional current source connected to the first electrode and the counter-electrode to produce a first unidirectional current, the first unidirectional current forming an arc which, in conjunction with the ionizable fluid, produces a plasma column between the first and counter-electrode on the one hand, and the workpieces to be welded on the other hand, the electrons in the plasma column travelling in a continuous uninterrupted stream toward said workpieces;
a second unidirectional current source connected to the counter-electrode and the workpieces to produce a second unidirectional current simultaneously with the first unidirectional current, the electrons forming the second unidirectional current flowing in a continuous uninterrupted stream from the workpieces to the counter-electrode; and
switching means for connecting the current sources to the two electrodes and the workpieces in separate alternative modes, the first mode supplying positive current to the counter-electrode and supplying negative current to the first electrode and the workpieces, the second mode supplying positive current to the workpieces and supplying negative current to the first electrode.

* * * * *